United States Patent
Li et al.

(10) Patent No.: US 8,046,211 B2
(45) Date of Patent: Oct. 25, 2011

(54) TECHNOLOGIES FOR STATISTICAL MACHINE TRANSLATION BASED ON GENERATED REORDERING KNOWLEDGE

(75) Inventors: Chi-Ho Li, Beijing (CN); Mu Li, Beijing (CN); Dongdong Zhang, Beijing (CN); Ming Lester Alexander Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1008 days.

(21) Appl. No.: 11/977,133

(22) Filed: Oct. 23, 2007

(65) Prior Publication Data

US 2009/0106015 A1    Apr. 23, 2009

(51) Int. Cl.
*G06F 17/20* (2006.01)
*G10L 21/00* (2006.01)

(52) U.S. Cl. ..................... 704/2; 704/3; 704/9

(58) Field of Classification Search ............ 704/2–9
See application file for complete search history.

(56) References Cited

U.S. PATENT DOCUMENTS

| | | | |
|---|---|---|---|
| 6,233,545 | B1 | 5/2001 | Datig |
| 7,200,550 | B2 | 4/2007 | Menezes et al. |
| 7,206,735 | B2 | 4/2007 | Menezes et al. |
| 2003/0023423 | A1* | 1/2003 | Yamada et al. ............ 704/2 |
| 2004/0024581 | A1 | 2/2004 | Koehn et al. |
| 2004/0030551 | A1 | 2/2004 | Marcu et al. |
| 2005/0049851 | A1 | 3/2005 | Watanabe et al. |
| 2006/0015320 | A1* | 1/2006 | Och ............................ 704/2 |
| 2006/0142995 | A1 | 6/2006 | Knight et al. |
| 2007/0016401 | A1 | 1/2007 | Ehsani et al. |

OTHER PUBLICATIONS

Kumar et al. 'Local Phrase Reordering Models for Statistical Machine Translation', Proceedings of Human Language Technology Conference and Conference on Empirical Methods in Natural Language Processing (HLT/EMNLP), pp. 161-168, Vancouver, Oct. 2005.*
Wu, Dekai, 'Stochastic Inversion Transduction Grammars and Bilingual Parsing of Parallel Corpora'. 1997 Computational Linguistics, vol. 23 Issue 3.*
Charniak, et al., "Syntax-based Language Models for Statistical Machine Translation" pp. 1-7.
Imamura, et al., "Practical Approach to Syntax-based Statistical Machine Translation", pp. 267-274.
Vogel, et al., "The CMU Statistical Machine Translation System", pp. 1-8.
Zens, et al., "Reordering Constraints for Phrase-Based Statistical Machine Translation", pp. 1-7.

* cited by examiner

*Primary Examiner* — Justin Rider
(74) *Attorney, Agent, or Firm* — L. Alan Collins; Collins & Collins Incorporated

(57) ABSTRACT

A method of statistical machine translation (SMT) is provided. The method comprises generating reordering knowledge based on the syntax of a source language (SL) and a number of alignment matrices that map sample SL sentences with sample target language (TL) sentences. The method further comprises receiving a SL word string and parsing the SL word string into a parse tree that represents the syntactic properties of the SL word string. The nodes on the parse tree are reordered based on the generated reordering knowledge in order to provide reordered word strings. The method further comprises translating a number of reordered word strings to create a number of TL word strings, and identifying a statistically preferred TL word string as a preferred translation of the SL word string.

19 Claims, 5 Drawing Sheets

500

| 560 |  |
|---|---|
| D N' → D N' | 0.9 |
| D N' → N' D | 0.1 |
| N Adj → N Adj | 0.2 |
| N Adj → Adj N | 0.8 |

P = 0.9 X 0.2

P = 0.1 X 0.2

P = 0.9 X 0.8

P = 0.1 X 0.8

TECHNOLOGIES FOR STATISTICAL MACHINE TRANSLATION BASED ON GENERATED REORDERING KNOWLEDGE

TECHNICAL FIELD

The technology relates to the field of statistical machine translation, and related translation endeavors.

BACKGROUND

Prior to modern computer capabilities, almost all translations were performed by a human translator. For example, during a conference of parties speaking different languages, it was common for a member to communicate with a human translator who could translate for both parties. However, due to the advancement of computer capabilities, statistical machine translation (SMT) has become more available.

In general, SMT involves the translation of text from a source language (SL) to a target language (TL), generally by utilizing a computing system to carry out machine translation operations. Many modern SMT systems involve the use of computer software to translate text or speech. The relatively high speed with which modern computer systems can process large quantities of data makes SMT a powerful tool for quickly translating large volumes of text.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method of SMT is provided wherein the method comprises generating reordering knowledge based on the syntax of a SL and a number of alignment matrices that map sample SL sentences with sample TL sentences. The method further comprises receiving a SL word string and parsing the SL word string into a parse tree that represents the syntactic properties of the SL word string. The nodes on the parse tree are reordered based on the generated reordering knowledge in order to provide reordered word strings. The method further comprises translating a number of reordered word strings to create a number of TL word strings, and identifying a statistically preferred TL word string as a preferred translation of the SL word string.

DESCRIPTION OF THE DRAWINGS

The accompanying drawings, which are incorporated in and form a part of this specification, illustrate embodiments of the technology for SMT processing and, together with the description, serve to explain principles discussed below.

Figure 1:
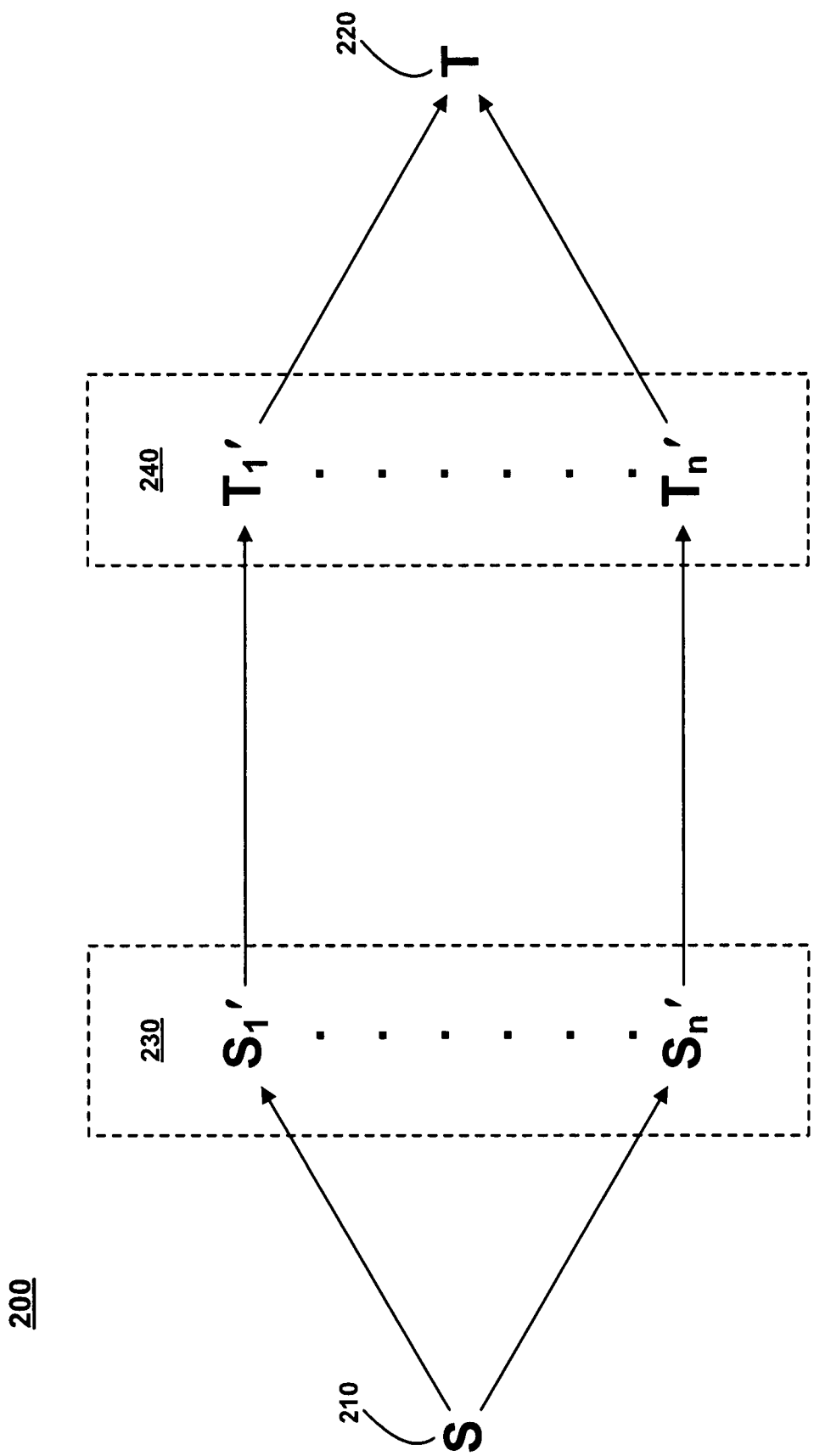
FIG. 1 is a flowchart of an exemplary translational process used in accordance with an embodiment of the present technology for translating an input string into an output string.

The drawings referred to in this description should be understood as not being drawn to scale except if specifically noted.

DETAILED DESCRIPTION

Reference will now be made in detail to embodiments of the present technology for SMT processing, examples of which are illustrated in the accompanying drawings. While the technology for SMT processing will be described in conjunction with various embodiments, it will be understood that they are not intended to limit the present technology for SMT processing to these embodiments. On the contrary, the presented technology for SMT processing is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology for SMT processing. However, the present technology for SMT processing may be practiced without these specific details. In other instances, well known methods, procedures, components, and circuits have not been described in detail as not to unnecessarily obscure aspects of the present embodiments.

It is understood that discussions throughout the present detailed description that utilize terms such as "using", "utilizing", "implementing", "mapping", "matching", "representing", "analyzing", "communicating", "receiving", "performing", "generating", "enabling", "presenting", "configuring", "training", "identifying", "calculating", "inverting", "ranking", "parsing", "preprocessing", "translating", "ordering", "reordering", "providing", "acquiring", and "accessing", or the like, may refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for SMT processing is also well suited to the use of other computer systems such as, for example, optical and mechanical computers.

Overview

In general, "machine translation" is a translation performed by a computer. While many may believe that modern machine translation processes entail one or more engineers painstakingly inputting a set of translation knowledge, such as may be found in a bilingual dictionary, into a computer, what makes SMT outstanding is that it does not rely on the manual inputting of translation knowledge. Rather, a comprehensive volume of text may be provided to the machine translation system, and the system can then "guess" the translation knowledge itself by implementing sophisticated statistical methods.

Thus, SMT is a process that is generally used by a machine translation system to translate a word string in a first natural language into a word string in a second natural language. For instance, words associated with a TL may be substituted for equivalent words in a SL string in order to generate a new string of text in the TL. However, merely translating terms in a string of text and outputting these terms in the same order that they were originally presented in the SL string may not provide a preferred translation when the syntax of the SL differs from that of the TL.

For instance, the English phrase "tall man" is equivalent to the Spanish phrase "hombre alto". Thus, it is not difficult to see that merely translating the terms "tall" and "man" in the English phrase into their Spanish equivalents will not generate the corresponding Spanish phrase "hombre alto". Rather, a process of word reordering may be needed, especially when translating longer and more complex strings, to reorder terms in a SL string such that multiple new term sequences are generated, and wherein a preferred translated term sequence is identified as a correct TL translation of the SL string.

It is understood that embodiments of the present technology provide a means of rearranging words in a SL string by implementing a reordering schema comprising a one-to-many transformation. For instance, a parse tree of a sentence that is to be translated may be generated, and the words of the sentence could be rearranged pursuant to a syntactic structure associated with the generated parse tree. Various other embodiments teach preprocessing a SL string such that the words of the string are rearranged into multiple distinct orders before a subsequent translation process is implemented. In this manner, multiple reordered term sequences are identified, and one of these term sequences may be selected based on an implemented probabilistic assessment of each of the sequences.

Generally, a SMT process comprises two primary stages. First, a training process is implemented wherein the machine translation system builds up its own translation knowledge. Second, a decoding process is implemented wherein a received SL string is translated into a corresponding TL string.

According to an embodiment of the present technology, during the training stage, the machine translation system is provided a set of training data, which comprises a comprehensive collection of sentence pairs. It is understood that a sentence pair comprises a sentence in a SL and a corresponding sentence in a TL. A word alignment process is applied to the training data, wherein for each sentence pair, a word alignment model produces an alignment matrix that indicates which SL words correspond to which TL words. By summing up all of the alignment matrices of all sentence pairs in the training data, a translation table can be obtained. The results of the alignment model can then be forwarded to a translation database used to store how words and phrases in a SL translate into words and phrases in a TL.

After the training process has been completed, the machine translation system may begin a subsequent decoding process in order to identify a preferred translation of a received SL string. With reference now to FIG. 1, an exemplary translational process 200 used in accordance with an embodiment of the present technology for translating an input string 210 into an output string 220 is shown. In the present embodiment, the input string 210 is comprised of multiple SL terms, while the output string 220 is comprised of one or more terms associated with a TL. The translational process 200 comprises reordering the terms of the input string 210 into different orders in order to generate a plurality of SL strings 230. The SL strings 230 correspond to a plurality of TL strings 240 which are the TL equivalents of the plurality of SL strings 230.

With reference still to the embodiment illustrated in FIG. 1, a target word string is identified from among the plurality of TL strings 240 as a correct translation of the input string 210. This target word string may be selected based on a set of reordering probabilities associated with the SL strings 230, as well as a scoring metric generated during a decoding stage of the SMT process. The identified word string may then be outputted as the output string 220.

For example, a probability of reordering the input string 210 as a specific SL string from among the plurality of SL strings 230 could be calculated for each string among the plurality of SL strings 230. Next, the calculated reordering probabilities could be used to generate a decoding score for each of the plurality of TL strings 240. A statistically preferred TL string could then be identified based on the generated decoding scores.

Therefore, it is understood that various embodiments of the present technology provide a dynamic approach to term reordering that allows many different SL strings to be considered as possible reordered string structures during the overall translation process, and wherein a target word string may be selected as a preferred translation of an input word string based on an assessment of calculated reordering probabilities and decoding scores. Moreover, various embodiments of the present technology present a novel approach to long-distance word reordering by arranging word orders by operations on a parse tree of a sentence or word string that is to be translated from a SL into a TL.

It is further understood that various exemplary embodiments of the present technology are described in the context of SMT processing. However, various embodiments of the present technology are also well suited to be used for machine mapping applications, as well as various probabilistic analysis and selection processes. Indeed, the present technology is also useful for manual translation applications, or processes involving the translation of non-textual subject matter. The embodiments described below are in the context of SMT processing for purposes of illustration and are not intended to limit the spirit or scope of the present technology.

String Preprocessing

Figure 2:
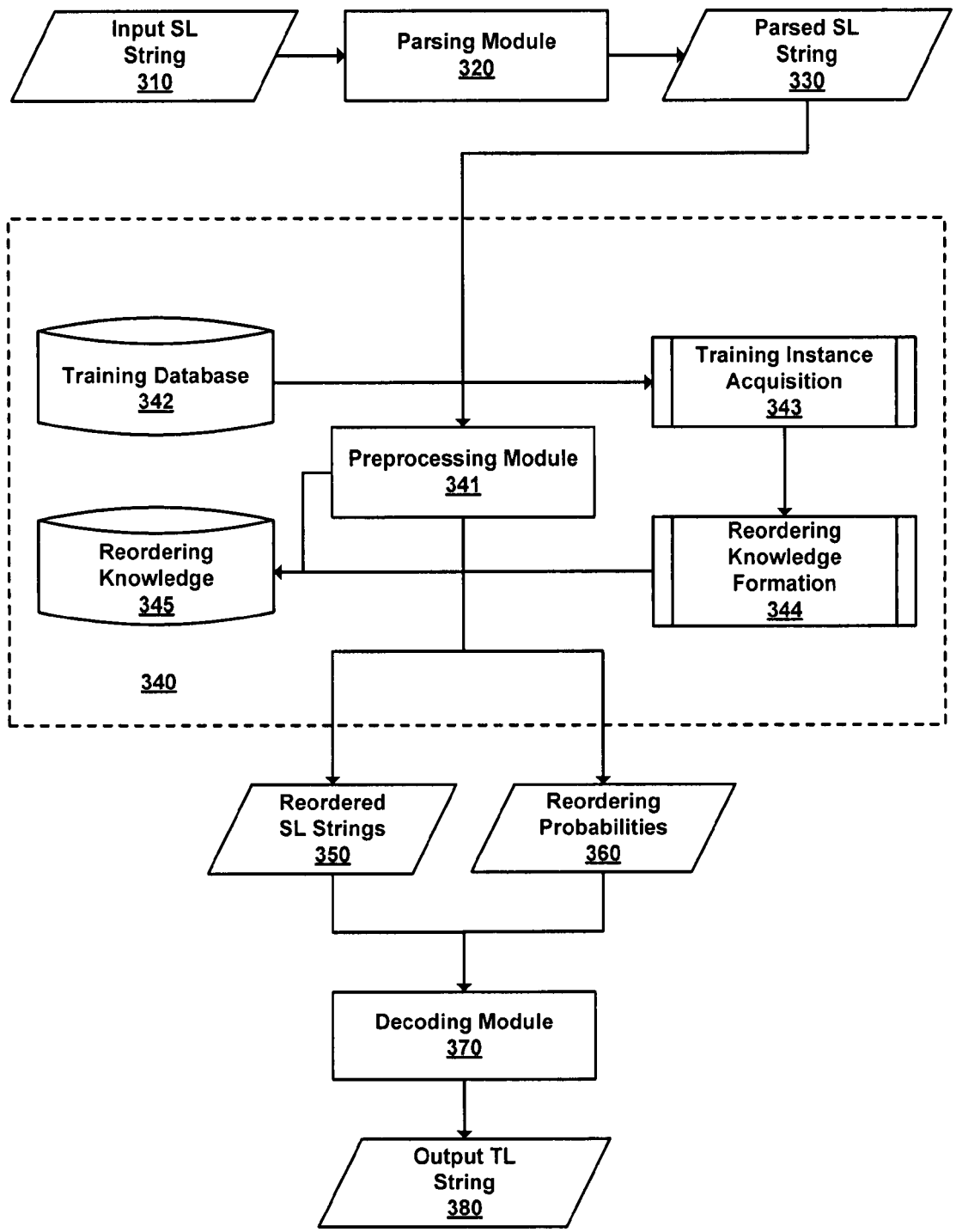
FIG. 2 is a block diagram of an exemplary processing environment used in accordance with an embodiment of the present technology for processing an input source language string.

With reference now to FIG. 2, an exemplary processing environment 300 for processing an input SL string 310 in accordance with an embodiment of the present technology is shown. The processing environment 300 comprises a parsing module 320 that receives the input SL string 310 and generates a parsed SL string 330. The parsed SL string 330 is then received by a reordering stage 340 which generates multiple reordered SL strings 350 which may then be analyzed and further processed during a comprehensive SMT process.

The parsing module 320 in FIG. 2 receives the input SL string 310 and parses the received input SL string 310 into a parse tree comprising multiple nodes, wherein the parse tree represents the syntactic structure of the input SL string 310 according to the SL syntax. For instance, the parsing module 320 could be configured to implement a syntactic analysis to parse the input SL string 310 into multiple nodes, wherein each node corresponds to a word or phrase found in the input SL string 310. The parsing module 320 could then divide the terms of the input SL string 310 into groups corresponding to syntactic components of the input SL string 310.

It is understood, however, that the aforementioned method of parsing the input SL string 310 is merely exemplary, and is not meant to narrow the scope of the present technology. Indeed, other methods of dividing the input SL string 310 into multiple components or nodes may be utilized.

With reference still to FIG. 2, the parsing module 320 generates a parsed SL string 330, which is a parse tree comprising the nodes generated during the parsing process. This parsed SL string 330 is then received by the reordering stage 340 which is configured to reorder the nodes of the parsed SL string 330 into different orders or sequences pursuant to a reordering model, such as a linguistic syntax-based reordering model. The reordering stage 340 is further utilized to generate multiple reordered SL strings 350 based on these different orders or sequences.

The reordering stage 340 comprises a preprocessing module 341 configured to receive the parsed SL string 330 and access the nodes of the parsed SL string 330. The preprocessing module 341 is further configured to analyze each node in the parse tree of the input SL string 310 in view of a reordering model that utilizes the syntax of the SL to determine if such nodes may be reordered so as to create a new sequence. For instance, the preprocessing module 341 will first analyze the top node of the parse tree, wherein the top node is itself a parent node, to determine, in view of data provided by the reordering model, how likely it is that the child nodes of the top node are to be inverted or reordered. The preprocessing module 341 could next analyze one of the aforementioned child nodes to determine if such child node is itself a parent node of two or more distinct child nodes, and then these other child nodes could be scrutinized using the reordering model to determine how likely it is that they are to be inverted or reordered. This process may continue until the preprocessing module 341 has reached the bottom of the parse tree.

The functionality of the preprocessing module 341, pursuant to various exemplary embodiments, will now be explained in further detail so as to illustrate various principles of the present technology. It is understood, however, that the embodiments described herein are provided for purposes of illustration and are not intended to limit the spirit or scope of the present technology.

The preprocessing module 341 utilizes a reordering knowledge 345 to reorder the terms of the parsed SL string 330, wherein the reordering knowledge 345 is based on the syntax of the SL and a number of alignment matrices that map sample SL sentences with sample TL sentences. The reordering knowledge 345 enables the preprocessing module 341 to determine whether one or more nodes in the parsed SL string 330 are to be reordered or not. This reordering knowledge 345 is acquired by collecting a set of training samples.

For instance, a set of training samples could be collected that comprise SL sentences paired with TL sentences. These sentence pairs could then be analyzed so as to compare how syntactic rules associated with word placement in the SL are different from the syntactic rules of the TL. In this manner, the collected training samples may be utilized to determine how words and phrases in the SL translate into words and phrases in the TL.

It is understood, however, that various methods exist for acquiring the aforementioned reordering knowledge 345. With reference still to FIG. 2, in one embodiment, the reordering stage 340 further comprises a training database 342. The training database 342 is used to store a set of training data, which comprises a collection of sentence pairs. A sentence pair comprises a sentence in a SL and a corresponding sentence in a TL. It is understood that this training database 342 may be accessed in order to obtain information pertaining to the stored sentence pairs.

Moreover, the preprocessing module 341 implements a training instance acquisition process 343 to acquire information needed in the reordering process. The objective of the training instance acquisition process 343 is to allow the preprocessing module 341 to design a form of reordering knowledge 345 that can be directly applied to parse tree nodes. The preprocessing module 341 accesses the training database 342 and collects training instances that map sample SL sentences with sample TL sentences. Specifically, the sample sentences are mapped such that SL terms are mapped to TL terms. In this manner, a number of alignment matrices may be generated that identify terms in the parsed SL string 330 that may be reordered with regard to a formal syntax.

In one embodiment, a training instance comprises a pair of SL phrases and a label that communicates whether the phrases are in a correct order or inverted with respect to a formal syntax. In another embodiment, the collected training data allows the preprocessing module 341 to identify individual terms that could be reordered in a term sequence in accordance with the SL syntax. In an alternative embodiment, the training data may enable the preprocessing module 341 to identify the number of instances of a particular SL term in a SL string, and whether the number of instances of this term needs to be increased or decreased based on the syntax associated with a TL.

It is therefore understood that the preprocessing module 341 may be configured to compare one or more phrase orders found in a SL sentence with a phrasal paradigm associated with a TL, and then generate training instances based on these phrase orders such that the training instances are configured to identify syntactic orders associated with various word phrases.

In one embodiment, an alignment model is used to map the occurrence of a SL term in a SL sentence to a corresponding TL term in a TL sentence. For each sentence pair, the word alignment model produces an alignment matrix, wherein SL terms are mapped to corresponding TL terms, and the respective orientations of the matching pairs create a number of training samples that the preprocessing module 341 can use in the reordering process. In this manner, a number of training instances are generated wherein each training instance comprises a pair of SL phrases and a pair of TL phrases, and which identifies an order of these SL phrases.

In another embodiment, the alignment model is configured such that matching pairs of terms in an alignment matrix are enumerated and arranged in an order in which the terms might appear in a TL string, according to syntactic rules associated with a TL. Due to a syntactic alignment inherent in the matrix, the monotonicity associated with SL and TL counterparts may be assessed in order to generate a model for reordering terms and phrases in the parsed SL string 330. Furthermore, the training instance acquisition process 343 may be applied to a great number of nodes associated with the sentence pairs in the training data in order to collect a comprehensive set of training samples, which may allow a more accurate and effective body of reordering knowledge to be generated.

Figure 3:
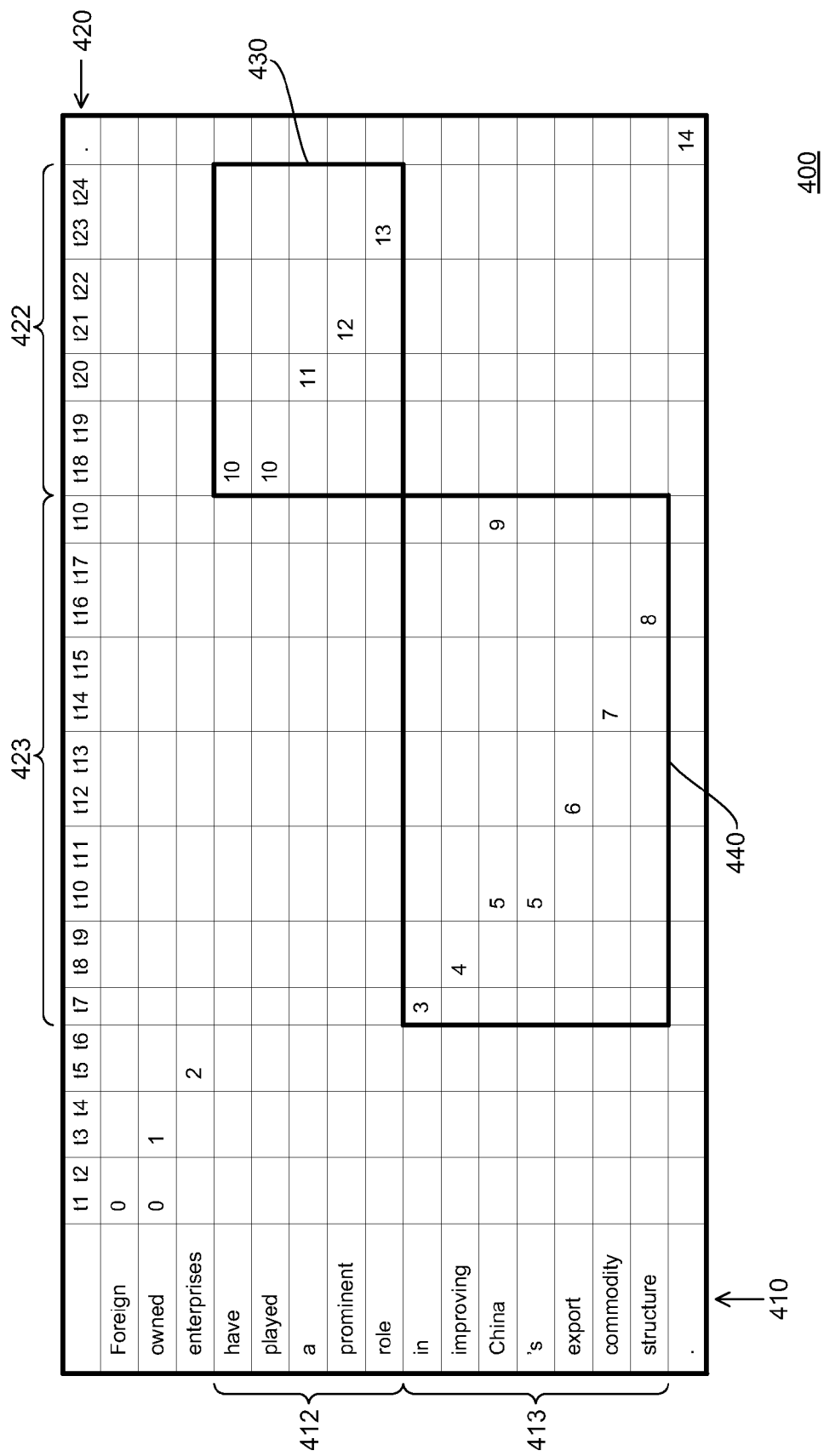
FIG. 3 is a diagram of an exemplary alignment matrix used in accordance with an embodiment of the present technology for aligning source language terms with target language terms.

With reference now to FIG. 3, an exemplary alignment matrix 400 for aligning SL terms with TL terms in accordance with an embodiment of the present technology is shown. The alignment matrix 400 allows a string of SL terms 410 to be compared with an associated string of TL terms 420. Individual SL terms are mapped to corresponding TL terms in order to acquire training samples for reordering parse tree nodes associated with the input SL string 310. In addition, matching terms are further enumerated for identification and reordering purposes.

In the example shown in FIG. 3, a first SL phrase 412 and a second SL phrase 413 are two word strings covered by two nodes in the parse tree of the string of SL terms 410. The first SL phrase 412 is mapped to a first TL phrase 422, while the second SL phrase 413 is mapped to a second TL phrase 413. The fact that the first SL phrase 412 precedes the second SL phrase 413 in the string of SL terms 410 whereas the TL counterparts of the two phrases are in the reverse order implies that the first SL phrase 412, the second SL phrase, the first TL phrase 422 and the second TL phrase constitute a single training instance of phrase inversion.

In one embodiment, the alignment matrix 400 may be used not only to identify one or more phrases of interest, but may also be used to identify individual terms of interest. For example, with reference to the second reordering possibility 440, a single instance of the term "china" occurs in the string of SL terms 410 while two instances of the same term are identified in the associated string of TL terms 420. Therefore, a third training instance is identified that will communicate to the preprocessing module 341 that one or more terms in the parsed SL string 330 may need to occur multiple times in a reordered string.

However, in certain cases, a TL equivalent of a particular SL term in a SL string may not be present in a corresponding translation of the SL string. Therefore, a training instance may be accessed that communicates to the preprocessing module 341 that one or more SL terms may be omitted from a reordered SL string.

The alignment matrix 400 in FIG. 3 has been presented merely to illustrate certain principles of the present technology. Indeed, this alignment matrix 400 is only one example of how such a matrix might be configured and implemented according to principles of the present technology. Other methods of generating training samples and analyzing nuances in syntactic phrase and string structure may be implemented.

With reference still to FIG. 2, the preprocessing module 341 next implements a reordering knowledge formation process 344 in which the acquired training samples are analyzed and processed to form a reordering knowledge 345 that the preprocessing module 341 will utilize during the SL term reordering process. It is understood, however, that various methods exist for forming such reordering knowledge 345 from a set of acquired training instances.

For example, a probabilistic reordering calculation could be implemented to determine whether one or more SL terms may be reordered in a new SL term sequence pursuant to a formal syntax. As a second example, a reordering probability could be calculated in order to identify a likelihood that two or more child nodes associated with a parent node are to be inverted with respect to a syntactic phrase structure.

In another embodiment, the reordering knowledge formation process 344 involves estimating a probabilistic distribution over all training samples. For instance, a maximum entropy (ME) model could be used to estimate such a probabilistic distribution over pairs of SL phrases, represented by specific features, in the parsed SL string 330. In an exemplary application of principles of the present technology, if the reordering knowledge 345 is generated using a maximum entropy (ME) model, then a reordering probability may be calculated or represented as:

$$P(r|f) = \frac{\exp\left(\sum_i \lambda_i f_i(N, r)\right)}{\sum_{r'} \exp\left(\sum_i \lambda_i f_i(N, r')\right)},$$

where r∈{IN-ORDER, INVERSED}, and where $f_i$'s and $\lambda_i$'s are features and feature weights, respectively, used in the maximum entropy (ME) model.

When accessing training samples during the training instance acquisition process 343, terms from two distinct phrases may sometimes overlap due to a mistake of an implemented word alignment process. For instance, two different phrases may contain a common term, but use that term in a different term grouping, or in a different context. This may have a detrimental effect on the reordering process where all points in the alignment matrices of a training corpus are collected in order to calculate a probabilistic distribution associated with a specific SL term sequence. Therefore, in another embodiment, the reordering knowledge formation process 344 is configured such that the preprocessing module 341 will ignore those phrases that overlap in order to ameliorate the quality of the reordering knowledge 345.

Although implementation of the aforementioned embodiment may reduce the available amount of training data, it is further understood that such data sparseness may be remedied by removing or ignoring alignment points in the matrix that are less probable so as to minimize the occurrence of overlapping phrases. For instance, after removing a particular alignment point, one of the phrases may become shorter such that there is a smaller probability of two phrases overlapping. Thus, in an alternative embodiment, the preprocessing module 341 is configured to redefine one or more pairs of overlapping phrases by iteratively removing less probable word alignments until these phrases no longer overlap. If after this redefining process two or more phrases continue to overlap, then a node corresponding to the overlapping phrases is not associated with a training instance.

Next, the preprocessing module 341 implements a reordering knowledge application process in which the reordering knowledge 345 is applied to the nodes of the parsed SL string 330 for the purpose of ordering terms and nodes into different orders. These reordered term sequences are then used to generate reordered SL strings 350 that can be further scrutinized to identify a preferred translation of the input SL string 310. It is understood, however, that various paradigms may be implemented to order the SL terms into different orders within the spirit and scope of the present technology.

In one embodiment, one or more of the nodes of the parsed SL string 330 are reordered, while the term sequence inherent in each node remains the same. For instance, the preprocessing module 341 could be configured to apply the reordering knowledge 345 to a parse tree corresponding to the parsed SL string 330 and identify multiple term sequences each comprising the nodes of the parsed SL string 330, but wherein the nodes are arranged in different orders. In an alternative embodiment, a node is comprised of two or more SL terms, and these terms are reordered based on a syntactic rule identified in the reordering knowledge 345.

In another embodiment, a node associated with the input SL string 310 is identified as being a parent node comprised of two or more nodal components. Furthermore, the reordering knowledge application process could comprise determining a likelihood of whether the nodal components, or children, of the binary node are to be inverted or reordered, such as by analyzing an inversion or reordering probability associated with the parent node. In this manner, the preprocessing module 341 could be configured to reorder the terms of one or more nodes based on a probabilistic assessment associated with one or more reordered forms of multiple nodal components.

To further illustrate, the reordering knowledge application process could comprise identifying a binary node, and its corresponding child nodes, associated with a parse tree of the parsed SL string 330. The preprocessing module 341 would calculate an inversion probability associated with the binary node, and determine how likely it is that the two child nodes of the binary node are to be inverted based on the inversion probability. Such an inversion probability could be generated, for example, according to a reordering estimation having the following form:

$$Z{:}X \cdot Y \Rightarrow \begin{cases} X \cdot Y \to P_r = p \\ Y \cdot X \to P_r = 1 - p \end{cases}$$

Here, Z represents a phrase having child nodes X and Y. A probability, p, that X and Y are not inverted in the corresponding TL phrase is calculated, along with a probability, 1-p, that these nodes are inverted.

It is understood, however, that the present technology is not limited to reordering child nodes associated with a binary parent node. Indeed, a probabilistic distribution could be calculated that may apply to parent nodes having any number of child nodes. For example, given that n! component sequences may exist for a parent node having n number of children, a reordering probability corresponding to a phrase comprised of three nodal components, $p_1$, $p_2$ and $p_3$, may be generated as:

$$P_r(r) \times P_r(p_1) \times P_r(p_2) \times P(p_3),$$

where r is one of six possible reordering patterns of the 3-ary parent node.

In yet another embodiment, the reordering knowledge application process comprises ranking the identified SL term sequences based on a scoring metric. For instance, a probability, $P_r(p \to p')$, of reordering terms in a phrase p into a new phrase p' could be identified, and this reordering probability could be used to score a term sequence comprising the reordered phrase p'. It is understood that various types of such scoring metrics may be implemented, and that the present technology is not limited to any one type of probabilistic modeling.

In one embodiment, a scoring metric, such as the scoring paradigm previously described, is used to identify a group of possible term sequences that most closely approximate a term order associated with a preferred translation of the input SL string 310. For instance, $2n^2$ possible reorderings may exist for a particular node if each of its child nodes has n reorderings, but because this number of reorderings may be relatively large, depending on the value of n, the top-scored n reorderings are flagged or recorded so as to generate a "n-preferred" group of possible term sequences. Thus, the preprocessing module 341 could be configured to generate a limited number of reordered term sequences rather than a different sequence for every term order permutation of the identified SL terms. This would have the practical effect of preserving precious processing time and energy while simultaneously increasing the efficiency of a translation model.

TABLE 1

| 1. Receive SL string: | "un hombre alto" |
| 2. Reorder child nodes of SL string into different orders: | "un hombre alto" |
| | → "un alto hombre" |
| | → "un hombre alto" |

An example of a simple reordering schema will now be presented in order to illustrate an embodiment of the present technology. With reference to Table 1, above, a SL string is received that is comprised of multiple nodes. In the provided example, a simple Spanish phrase is utilized for the sake of simplicity. The objective of the machine translation process is to translate the Spanish phrase "un hombre alto" into its English equivalent, "a tall man".

Due to syntactic differences between the English and Spanish languages, a simple translation of each of the terms in the SL string would not provide a "preferred" translation. However, this problem is solved by providing multiple possible arrangements for the terms of the SL string, and scrutinizing these arrangements using a probabilistic assessment in order to identify an arrangement that presents a preferred sequence of terms that may be used to generate a preferred translation.

With reference still to Table 1, after the SL string, "un hombre alto", is received, the terms of the string are ordered into two or more different sequences. In the example given, two possible term sequences are generated: "un alto hombre" and "un hombre alto". The first sequence, "un alto hombre", is a reordered string in which the terms "hombre" and "alto" have been inverted in the original term sequence of the SL string. Although the provided example utilizes a grammatically simple phrase for the sake of clarity, a greater number of reordered term sequences could be generated when translating longer SL strings.

The second sequence that is generated, "un hombre alto", presents the terms of the SL string in the original term sequence. One reason for retaining the original term sequence as a possible term sequence during the machine translation process is that a TL string that corresponds to a SL string may present the translated SL terms in the same exact order as the received SL string. Therefore, filtering the original term sequence from the group of reordered term sequences may have the practical effect of degrading translation quality. However, for the sake of brevity and simplicity, various references throughout this Detailed Specification to one or more reordered strings, reordered sequences, or the like, may include a sequence of terms that corresponds to the term sequence of the received SL string, even though the terms in this sequence are arranged pursuant to the original sequencing schema.

TABLE 2

| "un alto hombre" | → | $P_r$ = 0.95 |
| "un hombre alto" | → | $P_r$ |

With reference now to Table 2, above, an exemplary inversion probability format is demonstrated with reference to the Spanish SL string sequences in Table 1. An inversion probability of 5% has been assigned to the string "un hombre alto", which signifies that the probability, p, of the TL equivalents of the terms "hombre" and "alto" not being inverted in the corresponding TL string is relatively low. In contrast, an inversion probability of 95% has been assigned to the string "un alto hombre", which communicates that the probability, 1-p, of the terms "hombre" and "alto" being inverted in the corresponding TL string is relatively high.

However, the aforementioned inversion probability format is merely one way of assessing reordering probabilities associated with reordered term sequences. Other methods of comparing term sequences may also be implemented.

Once a reordered term sequence has been identified, the preprocessing module 341 is then able to create a reordered SL string comprising terms from the parsed SL string 330 arranged in the order of the reordered sequence. In one embodiment, the preprocessing module 341 generates multiple SL strings 350 each comprising the terms of the input SL string 310, but wherein the terms in each reordered string are arranged in a different order. The reordered SL strings 350 may then be transmitted to a decoding or translation module, where the reordered SL strings 350 may be translated into corresponding TL strings. Furthermore, in another embodiment, the preprocessing module outputs a group of generated reordering probabilities 360 that may be used to provide a logical or mathematical basis for selecting one of these TL strings as a preferred translation of the input SL string 310.

String Translation and Selection

After the reordering stage 340 has finished processing the parsed SL string 330, the reordered SL strings 350 and corresponding reordering probabilities 360 are received by a decoding module 370. The decoding module 370 is configured to translate the reordered SL strings 350 into corresponding TL strings, and one of these TL strings may then be identified as a preferred translation of the input SL string 310. For instance, the decoder 370 could be configured to implement a monotonous translation paradigm pursuant to which the terms of the reordered SL strings 350 are translated without further reordering the terms. In this manner, the term sequence of a generated TL strings mirrors the sequence of terms in its corresponding reordered SL string. It is understood, however, that a number of methods exist for decoding the reordered SL strings 350, and that the present technology is not limited to any particular decoding methodology.

With reference still to the embodiment illustrated in FIG. 2, the decoder 370 receives the generated reordering probabilities 360 and utilizes this information to select a preferred translation of the input SL string 310. It is understood that different methods may be implemented for applying the aforementioned reordering probabilities during the decoding process. In one embodiment, the decoding module 370 assigns a decoding score to each of the TL strings based on a reordering probability corresponding to each individual string. For instance, a reordering probability, $P_r(S \rightarrow S')$ of reordering the input SL string 310, represented as "S", into a specific reordered SL string, represented as "S'", could be calculated during the reordering stage 340 and then utilized by the decoding module 370 to generate a decoding score for a TL term sequence, represented as "T'", corresponding to the specific reordered SL string, S'.

In one embodiment, the following log-linear paradigm is utilized to generate a decoding score for T':

$$\exp\left(\lambda_r \log P_r(S \rightarrow S') + \sum_i \lambda_i F_i(S' \rightarrow T')\right)$$

In this exemplary paradigm, the first term of the formula corresponds to the contribution of syntax-based reordering in an overall reordering scheme. The second portion of the model takes into account specific features, represented as "$F_i$", used in the decoder. In addition, associated feature weights, represented as "$\lambda_i$", such as weights identified during a process of minimum error rate training, are also taken into account during the scoring paradigm.

After decoding scores have been assigned to the possible TL term sequences, one of the sequences may be selected based on its corresponding score. For instance, the calculated decoding scores could be compared to determine which of the possible TL term sequences, which correspond to the reordered SL strings 350, has been assigned the highest relative score. Once a TL term sequence has been identified as being a preferred translation of the input SL string 310, the decoding module 370 uses this term sequence to generate an output TL string 380. This output TL string 380 may then be accessed such that a preferred translation of the input SL string 310 may be acquired and implemented for various purposes.

TABLE 3

| | |
|---|---|
| 1. "un alto hombre"→ | $P_r$ = 0.95 |
| "un hombre alto"→ | $P_r$ = 0.05 |
| 2. "un alto hombre"→ | $T'_1$ = "a tall man" |
| "un hombre alto"→ | $T'_2$ = "a man who is tall" |
| 3. "a tall man" | → Score($T'_1$) = 0.0433 |
| "a man who is tall" | → Score($T'_2$) = 0.0083 |

With reference now to Table 3, above, an example of a string ranking and selection process is demonstrated with reference to the Spanish SL string sequences used in Table 1 and Table 2, supra. Reordering probabilities are calculated for each of the SL term sequences during a reordering stage 340, and a decoding module 370 generates TL term sequences that correspond to these SL sequences. In the present example, the SL phrases "un alto hombre" and "un hombre alto" are associated with their corresponding TL phrases, "a tall man" and "a man who is tall", respectively.

It is understood that a ranking schema may also be implemented to identify one or more possible term sequences that most closely approximate a term sequence of a preferred translation. Such a ranking schema could be based, for example, on decoding scores that take into account the calculated reordering probabilities, and may be useful when a relatively large number of possible reordered word strings exist for a received SL string.

With reference still to Table 3, a decoding score is assigned to each of the TL strings. In the present example, the phrase "a tall man" is assigned a score of 0.0433, while the phrase "a man who is tall" is assigned a score of 0.0083. These scores are calculated by taking into account the previously calculated reordering probabilities. It is understood, however, that the specific numerical scores referenced in Table 3 have been arbitrarily chosen to demonstrate principles of an embodiment of the present technology, and are not meant to demonstrate a preference for any one scoring model over alternative paradigms.

After the decoding scores have been generated, they may then be compared in order to select a single TL sequence that will be utilized to generate the output TL string 520. For example, the numerical value of 0.0433 could be compared with the value of 0.0083 to determine that a relatively higher score has been assigned to the phrase "a tall man". This phrase would then be utilized to generate a final TL string, represented as "T".

Example Reordering Paradigm

An exemplary reordering knowledge acquisition and application process will now be discussed so as to further illustrate various concepts of the present technology. As previously stated, an SMT process may comprise two primary stages: a training stage during which a machine translation system builds up its own translation knowledge, and a translation stage during which a decoder is used to translate a received SL string into a corresponding TL string. The implementation of these stages pursuant to an embodiment of the present technology is explained herein.

The SMT process begins with a training process during which a reordering knowledge is learned based on a set of training data. The training data comprises a comprehensive collection of sentence pairs, and may consist of a set of data used in ordinary SMT tasks. For each sentence pair in the training data, a process of word alignment is implemented wherein an alignment matrix of two corresponding sentences is provided. Thus, by going through all of the nodes on all parse trees of the sentence pairs in the training data, a comprehensive group of training instances may be collected. A training instance may comprise, for instance, a pair of SL phrases plus the label "IN-ORDER" or the label "INVERTED".

Next, a parsing process is implemented, which provides a syntactic analysis, in the form of a parse tree, of the SL sentence. Utilizing the parse tree, the machine translation system analyzes every parent node having two or more child nodes. These child nodes correspond to two or more different SL phrases, and from the alignment matrix two corresponding TL phrases may be identified. At this point, it may be determined whether the order of the pair of SL phrases is the same as the order of the pair of TL phrases.

The training instances are then fed to a machine learning algorithm, such as a maximum entropy (ME) model, which is configured to automatically learn a set of knowledge given a comprehensive amount of data. This algorithm is used to calculate the probability of a particular case in view of a particular condition. During a reordering process, this algorithm is used to calculate the probability that two nodes may be inverted or not, given the "features" of these two nodes. It is understood, however, that there are many ways to define such features when representing a node.

It is further understood that the learning process of the machine learning algorithm is based on the acquired training instances, and that the generated ME model represents the reordering knowledge itself. Thus, the reordering knowledge may itself be a ME model, which is based on training data comprising SL sentences paired with TL sentences.

After an ME model is generated, the model may then be applied. Given a source word string to be translated, a parse tree of the source word string is obtained from a parsing module. Each parent node having two or more child nodes is analyzed, and the probability of inverting and not inverting these child nodes is determined. All possible reordered forms, and associated reordering probabilities, of the parse tree may be obtained.

Figure 4:
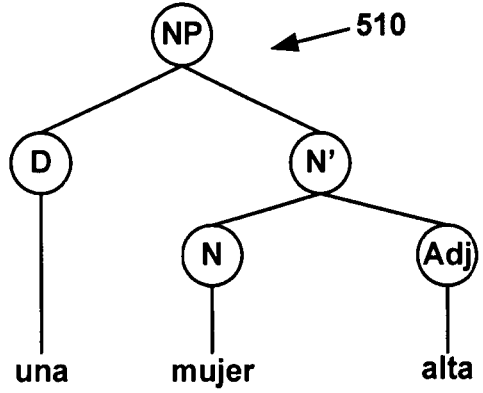
FIG. 4 is a diagram of an exemplary reordering paradigm used in accordance with an embodiment of the present technology for reordering terms in a received sequence of terms.
Figure 4:
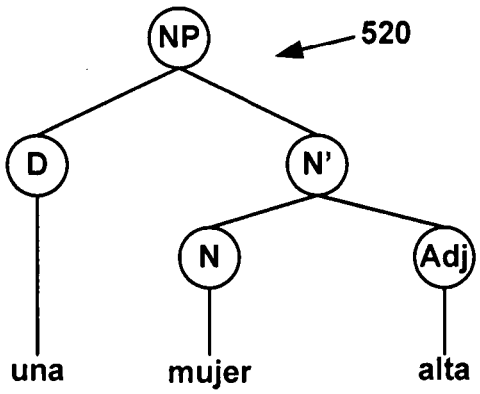
Figure 4:
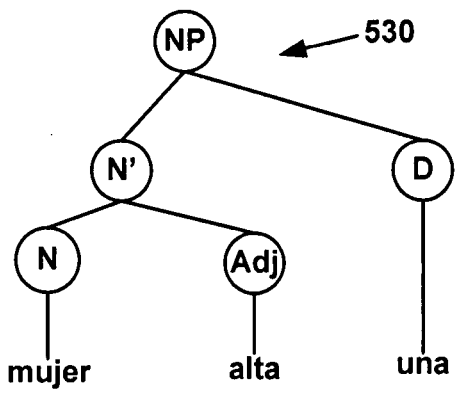
Figure 4:
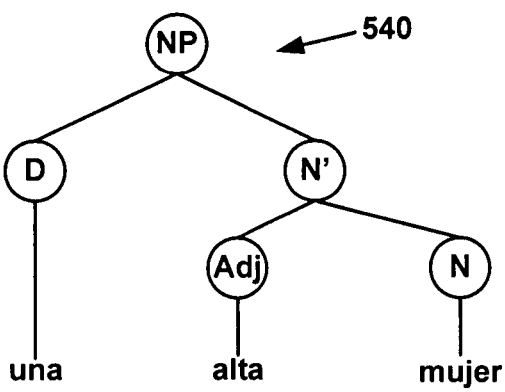
Figure 4:
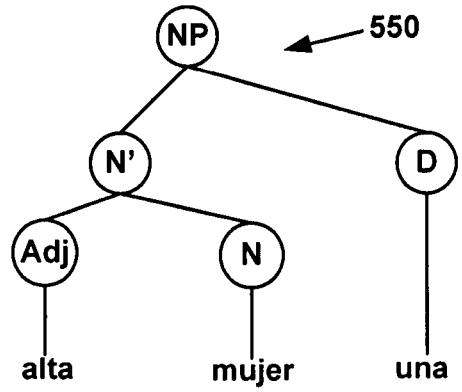

With reference now to FIG. 4, an exemplary reordering paradigm 500 for reordering terms in a received sequence of terms in accordance with an embodiment of the present technology is shown. The reordering paradigm 500 comprises parsing the received term sequence in order to create a parse tree 510 corresponding to the term sequence, wherein the parse tree 510 may be represented as an inverted tree structure comprising one or more parent nodes associated with a plurality of child nodes. A node corresponds to a phrase of the received term sequence. For example, the node N' corresponds to the phrase "mujer alta". It is understood, however, that although a Spanish word string has been selected for the illustrated embodiment, the present embodiment could also be used with other natural languages.

With reference still to FIG. 4, the terms of the received term sequence may be reordered into different possible term sequences by generating parse trees for each of these term sequences. In the illustrated embodiment, a first parse tree 520 is generated that corresponds to the term sequence "una mujer alta", and a second parse tree 530 is generated that corresponds to the term sequence "mujer alta una". Moreover, a third parse tree 540 is generated that corresponds to the term sequence "una alta mujer", and a fourth parse tree 550 is generated that corresponds to the term sequence "alta mujer una".

Figure 5:
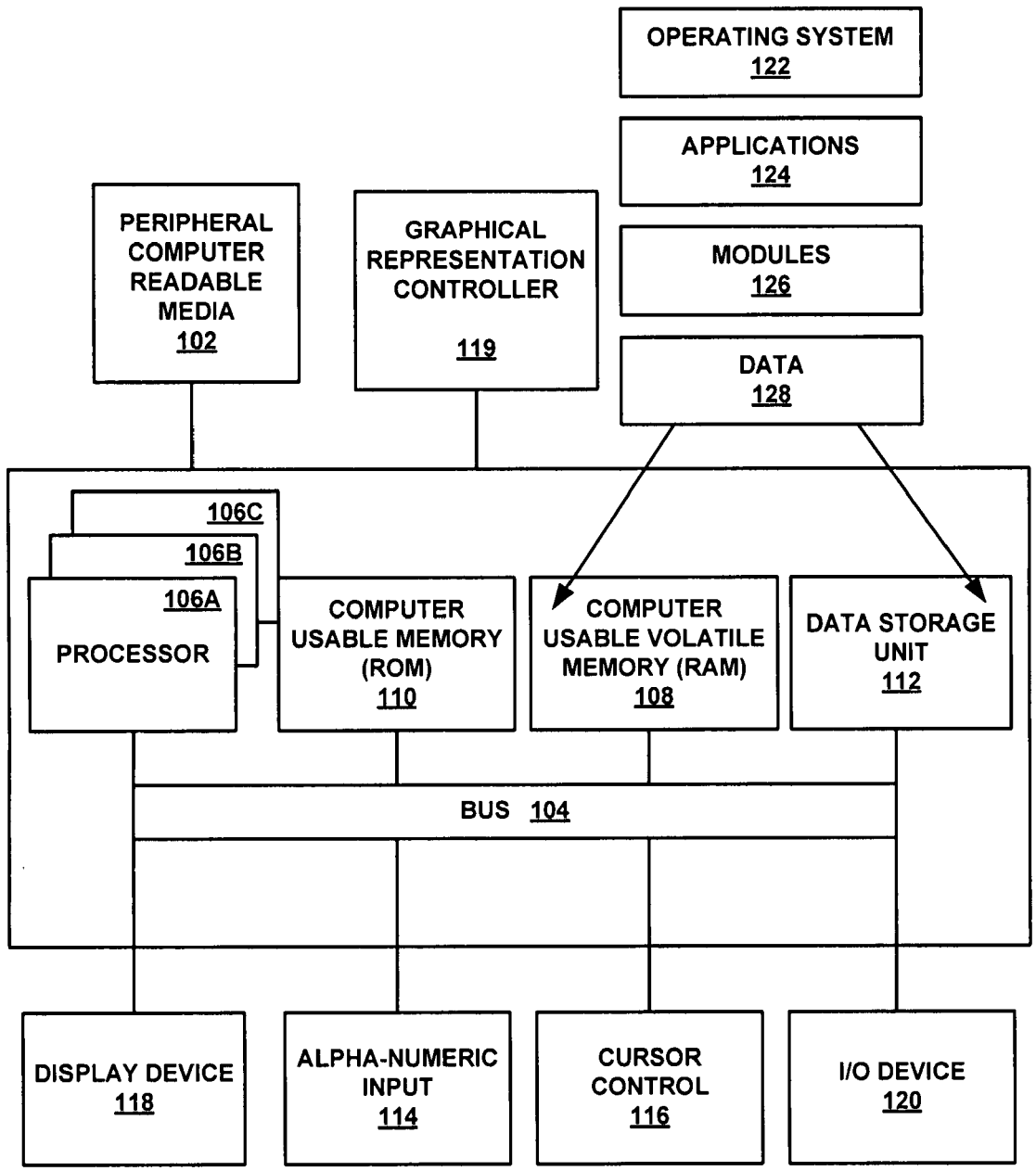
FIG. 5 is a diagram of an exemplary computer system used in accordance with an embodiment of the present technology for statistical machine translation (SMT).

As shown in FIG. 4, the reordered source word strings can be obtained from the reordered trees. It is understood, however, that the example shown in FIG. 5 is relatively simple in so much as four possible reordered forms are illustrated. Indeed, a greater number of possible reordered forms may exist for a sentence of average length.

With reference still to FIG. 4, reordering probabilities are calculated for each of the possible term sequences. For instance, a probability of reordering each group of child nodes corresponding to the same parent node could be calculated for each reordering possibility, and these reordering probabilities could be compiled as a set of probabilistic assessments 560. As shown in the set of probabilistic assessments 560, the probability of reordering the sequence of nodes D N' as D N' is determined to be 0.9, whereas the probability of reordering the sequence of nodes D N' as N' D is determined to be 0.1. Similarly, the probability of reordering the sequence of nodes N Adj as N Adj is determined to be 0.2, whereas the probability of reordering the sequence of nodes N Adj as Adj N is determined to be 0.8.

These probabilities can then be used to generate comprehensive reordering probabilities for the possible term sequences. For instance, a reordering probability P=0.9×0.2 is assigned to the term sequence "una mujer alta", which corresponds to the first parse tree 520. In this manner, reordering probabilities can also be calculated for the reordered term sequences corresponding to the second parse tree 530, the third parse tree 540 and the fourth parse tree 550, respectively.

The possible reordered term sequences may next be ranked with respect to their corresponding reordering probabilities, and the most likely, or "n-preferred", reorderd sequences may be selected accordingly. These reordered word strings and their associated reordering probabilities are then routed to a decoder, such as the decoding module 370 of FIG. 2. The decoder will translate the reordered word strings into TL word sequences, and score these TL word sequences based on the reordering probabilities associated with the reordered SL word strings that correspond to the TL word sequences. One of the TL word sequences may then be selected, based on this scoring paradigm, as a preferred translation of the originally received SL term sequence.

Example Computer System Environment

With reference now to FIG. 5, portions of the technology for SMT processing may be comprised of computer-readable and computer-executable instructions that reside, for example, in computer-usable media of a computer system. That is, FIG. 5 illustrates one example of a type of computer that can be used to implement embodiments, which are discussed below, of the present technology for SMT processing.

FIG. 5 illustrates an exemplary computer system 100 used in accordance with embodiments of the present technology for SMT processing. It is appreciated that computer system 100 of FIG. 5 is exemplary only and that the present technology for SMT processing can operate on or within a number of different computer systems including general purpose networked computer systems, embedded computer systems, routers, switches, server devices, consumer devices, various intermediate devices/artifacts, stand alone computer systems, and the like. As shown in FIG. 5, computer system 100 of FIG. 5 is well adapted to having peripheral computer readable media 102 such as, for example, a floppy disk, a compact disc, and the like coupled therewith.

Computer system 100 of FIG. 5 includes an address/data bus 104 for communicating information, and a processor 106A coupled with bus 104 for processing information and instructions. As depicted in FIG. 5, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g. random access memory (RAM), coupled with bus 104 for storing information and instructions for processors 106A, 106B, and 106C.

Computer system 100 also includes computer usable non-volatile memory 110, such as read only memory (ROM), coupled with bus 104 for storing static information and instructions for processors 106A, 106B, and 106C. Also present in computer system 100 is a data storage unit 112 (e.g., a magnetic or optical disk and disk drive) coupled with bus 104 for storing information and instructions. Computer system 100 also includes an optional alphanumeric input device 114 including alphanumeric and function keys coupled with bus 104 for communicating information and command selections to processor 106A or processors 106A, 106B, and 106C. Computer system 100 also includes an optional cursor control device 116 coupled with bus 104 for communicating user input information and command selections to processor 106A or processors 106A, 106B, and 106C. Computer system 100 of the present embodiment also includes an optional display device I 18 coupled with bus 104 for displaying information.

Referring still to FIG. 5, optional display device 118 of FIG. 5 may be a liquid crystal device, cathode ray tube, plasma display device or other display device suitable for creating graphic images and alphanumeric characters recognizable to a user. Computer system 100 may also include a graphical representation controller module 119 for enabling generation of graphical representations of portions of aggregated on-line security information from a plurality of sources.

Optional cursor control device 116 allows the computer user to dynamically signal the movement of a visible symbol (cursor) on display device 118. Many implementations of cursor control device 116 are known in the art including a trackball, mouse, touch pad, joystick or keys on alpha-numeric input device 114 capable of signaling movement of a given direction or manner of displacement. Alternatively, it will be appreciated that a cursor can be directed and/or activated via input from alpha-numeric input device 114 using keys and sequence commands.

Computer system 100 is also well suited to having a cursor directed by other means such as, for example, voice commands. Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet.

Referring still to FIG. 5, various other components are depicted for computer system 100. Specifically, when present, an operating system 122, applications 124, modules 126, and data 128 are shown as typically residing in one or some combination of computer usable volatile memory 108, e.g. random access memory (RAM), and data storage unit 112. In one embodiment, the present technology for SMT-processing, for example, is stored as an application 124 or module 126 in memory locations within computer usable volatile memory 108 and memory areas within data storage unit 112.

It is understood that computer system 100 is only one example of a suitable computing environment and is not intended to suggest any limitation as to the scope of use or functionality of the present technology. Neither should computer system 100 be interpreted as having any dependency or requirement relating to any one or combination of components illustrated in the computer system 100.

Embodiments of the present technology are operational with numerous other general-purpose or special-purpose computing system environments or configurations. Examples of well known computing systems, environments, and configurations that may be suitable for use with the present technology include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Furthermore, embodiments of the present technology may be described in the general context of computer-executable instructions, such as program modules, being, executed by a computer. Generally, program modules include routines, programs, objects, components, data structures, etc., that perform particular tasks or implement particular abstract data types. Embodiments of the present technology may also be practiced in distributed computing environments where tasks are performed by remote processing devices that are linked through a communications network. In a distributed computing environment, program modules may be located in both local and remote computer-storage media including memory-storage devices.

Although electronic and software-based systems are discussed herein, they are merely examples of computing environments that might be utilized, and are not intended to suggest any limitation as to the scope of use or functionality of the present technology. Neither should such electronic systems be interpreted as having any dependency or relation to any one or combination of components illustrated in the disclosed examples.

Moreover, the present technology may be described in the general context of computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although various embodiments of the present technology have been described with reference to specific structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one memory device storing instructions that, when executed by a computer, cause the computer to perform a method of statistical machine translation (SMT), said method comprising:

receiving a word string in a first natural language;

parsing said word string into a parse tree comprising a plurality of child nodes, the parse tree representing a syntactic structure of the word string;

reordering said plurality of child nodes resulting in a plurality of reordered word strings;

evaluating each of said plurality of reordered word strings using a reordering knowledge, wherein said reordering knowledge is based on a syntax of said first natural language and on a plurality of alignment matrices that map first sample sentences in the first natural language with second sample sentences in a second natural language;

translating a plurality of preferred reordered word strings from said plurality of reordered word strings to the second natural language based on said evaluating; and selecting a statistically preferred translation of said word string from among translations of said plurality of preferred reordered word strings.

2. The at least one memory device of claim 1, the method further comprising:

accessing training data comprising the first sample sentences paired with the second sample sentences;

matching, utilizing an alignment model, words and phrases of the first sample sentences to words and phrases of the second sample sentences;

generating training samples based on results of said alignment model, said training samples identifying syntactic differences between said first natural language and said second natural language;

generating, based on the training samples, the plurality of alignment matrices that identify terms on the word string that can be reordered; and generating said reordering knowledge based on estimating a probabilistic distribution over said training samples.

3. The at least one memory device of claim 1, the method further comprising:

identifying a group of child nodes from said plurality of child nodes, each child node of the group associated with a same parent node;

calculating, based on the reordering knowledge, an inversion probability corresponding to said group of child nodes; and inverting child nodes from said group of child nodes based on said inversion probability.

4. The at least one memory device of claim 1, the method further comprising:

generating reordering probabilities by calculating probabilities of reordering words from said plurality of child nodes into reordered phrases; and identifying said plurality of preferred reordered word strings based on said reordering probabilities.

5. The at least one memory device of claim 4, the method further comprising:

ranking said plurality of reordered word strings based on said reordering probabilities; and identifying said plurality of preferred reordered word strings from among said ranked reordered word strings.

6. The at least one memory device of claim 4, the method further comprising:

scoring said plurality of preferred reordered word strings based on said reordering probabilities; and identifying said statistically preferred translation of said word string based on said scoring.

7. A statistical machine translation (SMT) system comprising:

a computer;

a parsing module implemented by the computer and configured to receive a word string in a first natural language and parse said word string into a parse tree comprising a plurality of child nodes, the parse tree representing a syntactic structure of the word string;

a preprocessing module implemented by the computer and coupled with said parsing module, said preprocessing module configured to access said plurality of child nodes and reorder words from said word string based on a syntax of said first natural language and on a plurality of alignment matrices that map first sample sentences in the first natural language with second sample sentences in a second natural language to provide a plurality of reordered word strings; and a decoding module implemented by the computer and coupled with said preprocessing module, said decoding module configured to access said plurality of reordered word strings, identify a statistically preferred reordered word string based on reordering probabilities associated with said plurality of reordered word strings, and generate a target word string based on a word sequence of said statistically preferred reordered word string.

8. The system of claim 7 wherein said preprocessing module is further configured to access training data comprising sentences in said first natural language paired with sentences in a second natural language, utilize said training data to match words and phrases in said first natural language to words and phrases in said second natural language, generate training samples identifying syntactic differences between said first natural language and said second natural language, and utilize said training samples to reorder said words from said word string.

9. The system of claim 8 wherein said preprocessing module is further configured to identify a group of child nodes from said plurality of child nodes associated with a same parent node, calculate an inversion probability corresponding to said group of child nodes using said training samples, and invert child nodes from said group of child nodes based on said inversion probability.

10. The system of claim 8, wherein said preprocessing module is further configured to calculate probabilities of reordering words from said plurality of child nodes into reordered phrases based on said training samples, generate said reordering probabilities based on said calculated probabilities, and forward said reordering probabilities to said decoding module.

11. The system of claim 7, wherein said preprocessing module is further configured to rank said plurality of reordered word strings based on said reordering probabilities.

12. The system of claim 7, wherein said preprocessing module is further configured to identify reordered word strings from said plurality of reordered word strings associated with reordering probabilities above a threshold.

13. The system of claim 7, wherein said decoding module is further configured to translate said plurality of reordered word strings into corresponding target word strings and select said target word string from among said corresponding target word strings based on said reordering probabilities and other translation factors.

14. A language reordering system for use in statistical machine translation (SMT), said language reordering system comprising:

a computer;

a training database for storing training data comprising sentences in a first natural language paired with sentences in a second natural language;

an alignment model implemented by the computer and configured to match words and phrases in said first natural language to words and phrases in said second natural language, said alignment model utilizing said training data to generate training samples identifying syntactic differences between said first natural language and said second natural language; and a preprocessing module implemented by the computer and coupled with said training database and said alignment model, said preprocessing module configured to generate a body of reordering knowledge based on a syntax of said first natural language and on a plurality of alignment matrices that map first sample sentences in the first natural language with second sample sentences in the second natural language.

15. The language reordering system of claim 14 wherein said preprocessing module is further configured to receive a word string in said first natural language and utilize said reordering knowledge to reorder words from said word string into reordered word strings.

16. The language reordering system of claim 15 wherein said preprocessing module is further configured to identify a group of child nodes corresponding to a parent node of said word string, calculate an inversion probability corresponding to said group of child nodes, and invert child nodes from said group of child nodes based on said inversion probability.

17. The language reordering system of claim 15 wherein said preprocessing module is further configured to generate reordering probabilities by calculating probabilities of reordering words from said word string into said reordered word strings.

18. The language reordering system of claim 17 wherein said preprocessing module is further configured to identify at least one statistically preferred reordered word string from said reordered word strings based on said reordering probabilities.

19. The language reordering system of claim 17 wherein said preprocessing module is further configured to rank said reordered word strings based on said reordering probabilities and identify a statistically preferred group of reordered word strings from among said ranked reordered word strings.

* * * * *